3,334,537
LIGHT SCATTERING ATTACHMENT
Willard H. Beattie, Long Beach, Calif., assignor to Beckman Instruments, Inc., a corporation of California
Filed Apr. 29, 1963, Ser. No. 276,450
6 Claims. (Cl. 88—14)

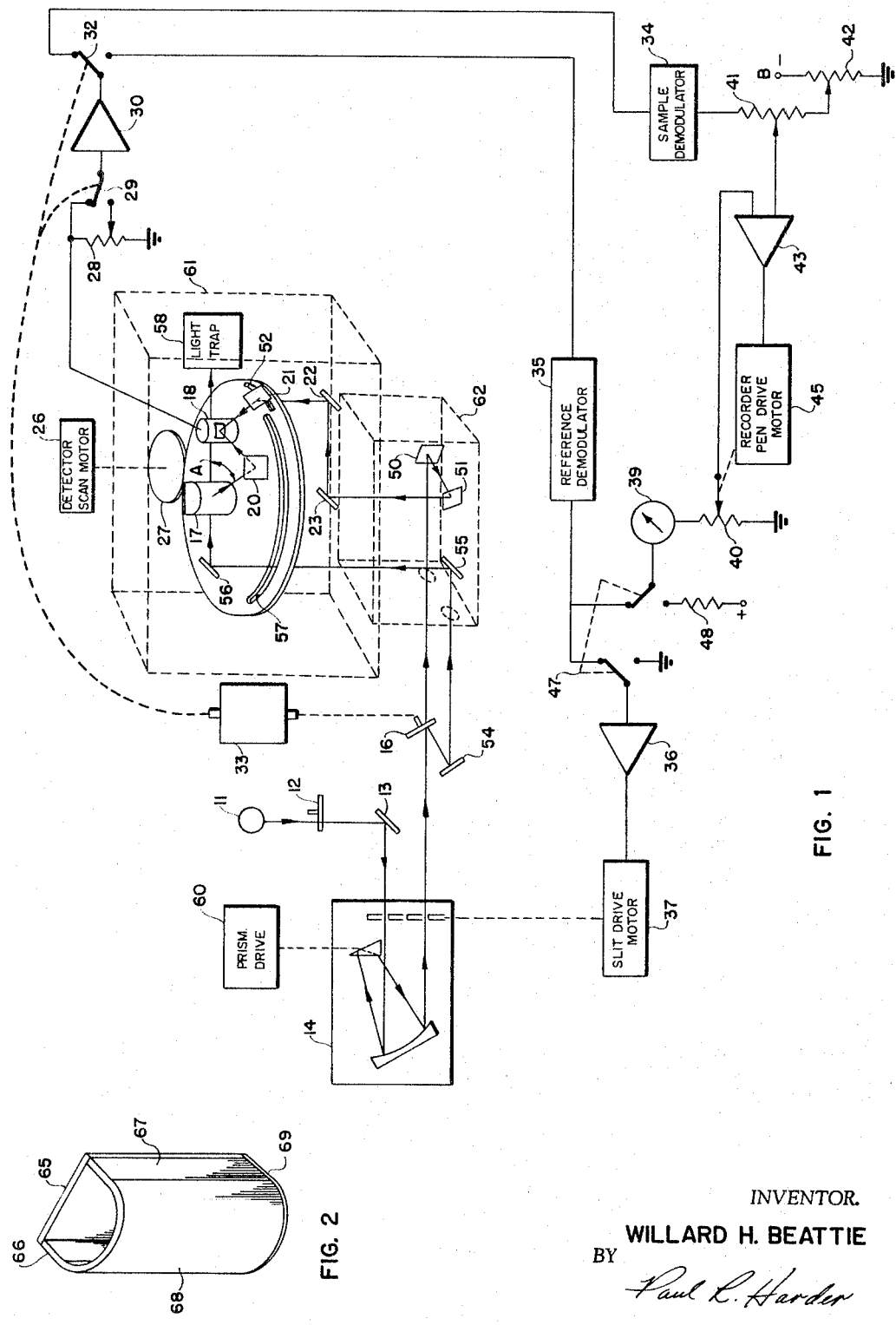

This invention relates generally to spectroscopy and more particularly relates to methods and apparatus for measuring the light scattering characteristics of samples.

Certain analytical methods such as the calibration of light scattering photometers with spectrophotometers using a suspension of small particles such as colloid silica and methods for determining the particle size may require that light scattering and spectrophotometric turbidity measurements be made in conjunction with each other. All light scattering photometers of the prior art have been instruments independent of the spectrophotometer resulting in errors because of wavelength calibration and wavelength resolution variations between the instruments. These errors can be minimized if both measurements are made on the same instruments. Further, light scattering photometers of the prior art have required filters to provide monochromatic light. Many of these instruments have employed mercury arc lamps therefore providing only certain wavelengths, usually 436 m$\mu$ and 546 m$\mu$. Therefore, it has not been possible to record the scattered intensity as a function of wavelength. Conventional light scattering photometers of the prior art have provided a readout by means of a galvanometer, microammeter or recorder. The recorders have not generally been synchronized with the motor driven angular scanning elements of the light scattering photometers, therefore it has generally not been possible to record the scattered intensity as a function of angle.

Various single purpose cells have been provided for use with the light scattering photometers of the prior art. Rectangular cells provide for measurement of 90° scattering only while hemi-octagonal cells allow measurements at 45°, 90° and 135°. Cylindrical cells with flat entrance and exit windows such as that disclosed by L. T. Witnauer and H. J. Scherr, The Review of Scientific Instruments, vol. 23, p. 99, 1952, have an angular range of 22° to 160° but have generally suffered from relatively high stray light. The Zimm type cell (Journal of Chemical Physics, vol. 16, No. 12, p. 1099, 1948) consists of a conical glass jacket filled with an optical coupling liquid which also provides thermostating and in which is immersed a second cell containing the sample. Parallel light beams cannot be maintained through this type of cell and the sample cell is difficult to fill. Various other complex cells utilizing baffles, stops and entrance channels have reduced stray light to a minimum but are difficult to clean, fill and thermostat and are generally limited to a single purpose.

It is therefore a principal object of this invention to provide new and improved apparatus and methods for performing various light scattering analyses.

Another object is to provide a light scattering attachment capable of use with a spectrophotometer.

A further object of the invention is the provision of an apparatus wherein the scattered intensity or the ratio of the scattered intensity to the reference intensity may be plotted as a function of time, angle or wavelength.

Still another object is to provide an apparatus wherein a source of any desired wavelength over a wide range may readily be selected.

Yet another object of the present invention is the provision of a light scattering attachment for a spectrophotometer incorporating a novel sample cell wherein the beam through the cell is of constant size; stray light is minimized yet allowing measurement of scattered light over a wide angular span.

A still further object is the provision of a sample cell having the foregoing advantages yet is simple of shape so as to allow ease of removal, cleaning and closeness of fit of a thermostating jacket; that is large enough to allow dilution or stirring of the sample within the cell and which will accept inner cells for use with small samples.

To accomplish the foregoing objects the invention generally contemplates a light scattering attachment comprising an enclosure which may be fitted over the cell compartment of a double beam spectrophotometer, the enclosure having a projecting portion which fits into the cell compartment and therefore into the radiation path of the spectrophotometer's light source. A rotatable disc and a light scattering cell are supported within the upper portion of the enclosure. A detector, a plurality of mirrors and a diffuse reflector are mounted upon the disc and rotation of the disc varies the angle of the detected scattered beam with respect to the transmitted beam. A second radiation path is provided whereby the radiation beam utilized as a reference is at all angles focused on the detector. Thus, by operating the spectrophotometer in the single beam mode the scattered light intensity may be measured as a function of time, angle or wavelength and when operated in the double beam mode the ratio of the scattered light intensity to the reference intensity may be plotted as a function of time, angle or wavelength.

The invention further provides a multi-purpose cell assembly combining many of the advantages of separate cells of the prior art. Flat excitation beam entrance and exit windows are provided such that the beam size through the cell is maintained constant and stray light is minimized by a flat back and bottom of black glass. The front surface of the cell is cylindrical in configuration. The cell is inserted into a close fitting thermostating jacket which is fastened to a cell table but is easily removable for installation of special purpose cells or sample holders. An inner cell and cell holder is provided and when utilized an optical coupling liquid is placed in the outer cell.

The invention is described in greater detail by reference to the accompanying drawing wherein an exemplary preferred embodiment of the invention is illustrated and in which:

FIG. 1 is a diagram of an exemplary embodiment of the apparatus;

FIG. 2 is a detailed view of the scattered light cell unit for use in the apparatus of FIG. 1.

Referring now in greater detail to the drawing and more particularly to FIG. 1 thereof there is illustrated an exemplary embodiment of the light scattering attachment in combination with a diagrammatic representation of a spectrophotometer. The apparatus generally comprises a radiation source 11, a modulator or beam chopper 12 and a mirror 13 for directing the modulated beam through the entrance slit of a monochromator 14. The beam from the exit slit of the monochromator is directed to a rotating half mirror or beam splitter 16 which provides an excitation radiation path to sample cell 17 and a reference beam path directly to detector 18. If desired, suitable optical devices may be provided to maintain the excitation beam parallel.

Detector 18, mirrors 20, 21 and 22 and diffuse reflector 23 are each mounted on rotatable disc 24 which may be either rotated manually or by a detector scan motor 26 through a gear drive 27. The light scattering cell 17 is mounted coaxially with the disc but is not secured thereto and is stationary. The diffuse reflector 23 is mounted directly below the center of the disc and being secured thereto, rotates therewith.

The electrical signal output of the detector 18 is connected through an attenuator 28 and commutator 29 to an amplifier 30. The output of the amplifier is connected to a commutator 32 driven by motor 33 which also drives the half mirror or beam splitter 16 and the commutator 29 in synchronism with the commutator 32. Since the intensity of the scattered light is generally much lower than the intensity of the reference beam, commutator 29 is synchronized with beam splitter 16 such that output of the detector due to the scattered light is passed to the amplifier unattenuated while the output due to the reference beam is attenuated. The output of amplifier 30 is alternately connected to a sample demodulator 34 and a reference demodulator 35. The output of the reference demodulator 35, generally referred to as the reference signal, is connected through an amplifier 36 to a slit drive motor 37 to control the slit size and therefore the energy in the excitation beam to the sample cell. As is well known in the art this slit width control circuit provides constant energy in the excitation beam thereby compensating for variations in instrument efficiency at various wavelengths and in source output. The output from the reference demodulator 35 is also generally connected through an indicating meter 39 and a potentiometer 40 to a point of common potential or circuit ground.

The output of the sample demodulator 34, generally referred to as the sample signal, is connected through potentiometer 41 and the movable contact of potentiometer 42 to the point of common potential. The movable contacts of potentiometers 40 and 41 are connected to the inputs of the differential amplifier 43 the output of which is utilized to energize a recorder pen drive motor 45. The pen drive motor drives the marking pen of any suitable chart recorder and is also connected to the movable contact of potentiometer 40 to provide a feedback connected to differential amplifier 43. When the instrument is operated as thus far described and as illustrated in FIG. 1, i.e., in the double beam mode, the chart recorder provides a record of the ratio of the scattered light intensity to the reference light intensity either as a function of time, angle or wavelength depending upon the operation of the various other components of the system. Potentiometer 41 provides for setting the 100% point on the ratio recording scale and potentiometer 42 provides for setting the zero point on the ratio recording scale.

Switch 47 in the output circuit of reference demodulator 35 provides for disconnecting the slit drive motor 37 and amplifier 36 and the pen drive motor 45 and amplifier 43 from the reference signal. When switch 47 is actuated, the slit drive motor amplifier 36 is connected to circuit ground and meter 39 and potentiometer 40 are connected to a source of reference potential through resistor 48. When switch 47 is actuated, the instrument operates in the single beam mode and the output of the detector due to only the scattered light intensity provides the only input signal to amplifier 43. Thus, the recorder provides a record of the scattered light intensity as a function of time, angle or wavelength depending upon the operation of the other components within the system.

The rotating half mirror or beam splitter 16 provides radiation along the excitation path and the reference path alternately in synchronism with the commutators 29 and 32. The reference beam path includes mirrors 50 and 51, diffuse reflector 23 and mirrors 22 and 21. Mirror 50 is positioned in the reference beam path of the conventional spectrophotometer and reflects the radiation to mirror 51 positioned directly below the diffuse reflector 23, i.e., along the axis of rotatable disc 24. The reference beam is reflected by mirror 51 onto diffuse reflector 23 which reflects the central portion of the beam onto detector 18 by mirrors 22 and 21 through aperture 52 in rotatable disc 24.

Radiation from the exit slit of the monochromator is reflected by the beam splitter 16 to form the excitation beam which is reflected by mirrors 54, 55 and 56 to the entrance window of light scattering cell 17. Mirrors 54–56 are each stationary and an excitation beam path is provided through rotatable disc 24 by the elongated slot or aperture 57 thus allowing rotation thereof without interference with the excitation beam path. Since the beam entrance and exit windows of cell 17 are flat the size of the beam passing through cell is constant and the transmitted beam is adsorbed in a light trap 58. The scattered beam is reflected by mirror 20 onto detector 18 and with the structure illustrated herein, the angle A at which scattered light is measured relative to the exit beam path may be scanned over the range of about 0° to 158° and is limited only by the configuration of the sample or the sample cell. The angle of acceptance of the scattered beam by the photo multiplier may be limited by apertures and lenses thereby providing high angular resolution.

The beam chopper 12 is generally a motor driven apertured disc which interrupts the beam at a suitable frequency, typically 480 cycles per second. The entrance and exit beams of the monochromator 14 are generally disposed one above the other to permit usage of a single pair of slit jaws. The monochromator disperses the radiation of the source to provide a narrow band of radiation at the sample cell and this narrow band may be scanned over a wide spectrum by rotating the prism with a prism drive 60. It is obvious to those skilled in the art that other types of monochromators may be utilized, various filters, condensing and collimating mirrors and condensing lenses may be utilized in the monochromator which have been omitted for the sake of simplicity.

As has been hereinbefore stated, the light scattering photometers of the prior art have employed filters to provide monochromatic light and have employed mercury arc lamps providing only certain wavelengths of radiation. In the present invention light of any wavelength between 320 m$\mu$ and 650 m$\mu$ may be utilized. This is accomplished by using a brilliant source such, for example, as an Osram HBO 100 high pressure mercury arc and a monochromator. This source provides particularly high intensities at 436 m$\mu$ and 546 m$\mu$ and can be utilized for applications involving low scattering systems, for example, the scattering by a pure liquid. In high scattering systems the ability to select a desired wavelength provides the advantage that the particle size of absorbing or colored particles can be determined by selecting a wavelength where no absorption occurs. Light scattering and fluorescence can readily be distinguished by varying the wavelength since fluorescence does not occur above a certain wavelength. Studies of particle size or molecular weight distributions and studies of particle shape are greatly facilitated by the ability to vary the wavelength as well as measurement of the angle of scatter. The range of wavelength may be extended to 220 m$\mu$ by substituting quartz optical components for the Pyrex components generally utilized.

As indicated by the dotted lines the light scattering device may readily comprise an attachment for use with conventional spectrophotometers. The attachment is provided with an enclosure in which the various parts are mounted and comprises a large compartment 61 within which the rotating disc, the cell and certain of the mirrors are mounted and a projecting portion 62 which fits into the cell compartment of the conventional spectrophotometer. Thus in applications where light scattering and spectrophotometric turbidity measurements must be made in conjunction with each other a single instrument is provided which is capable of performing these measurements thus eliminating errors due to wavelength calibration and wavelength resolution between two separate instruments.

Referring now to FIG. 2 there is illustrated a multi-purpose cell for use with the light scattering instrument of FIG. 1. The cell generally comprises a flat back 65, a flat entrance face 66, a flat exit face 67 and a cylindrical front 68. The entrance and exit faces and the cylindrical front are formed from one piece of transparent material preferably selected Pyrex and the back and bottom are made of opaque material, such as black glass. The cell is cemented together with epoxy resin and an opaque cover may be provided if desirable, likewise preferably made of black glass. The inner and outer surfaces of the entrance and exit windows are parallel and the cell is mounted such that these faces are perpendicular to the excitation beam therefore the beam size through the cell is constant. The black back and bottom minimizes stray light by absorbing light scattered onto these surfaces by the sample. A cylindrical front is provided such that the scattered light may be measured over a wide range of angles.

The light scattering cell fits into a close fitting thermostating jacket having a suitable opening for the transmission of the excitation beam and a path for measuring the scattered light. As has been hereinbefore pointed out the cell is large enough to allow dilution and stirring of samples within the cell and will accept smaller inner cells for use with small samples. When a smaller inner cell is utilized it is generally desirable to fill the outer cell with a liquid having approximately the same refractive index as the solution or sample and in which is immersed the smaller cell. The smaller cell may be held by any suitable holder which may be placed on the thermostating jacket above the multipurpose cell and detents may be provided in the thermal fitting jacket for centering the smaller sample cell at the center of the excitation beam path through the outer cell.

Although the invention has been described with particularity in connection with FIGS. 1 and 2 it is to be understood that the figures are merely exemplary embodiments of the invention and that variations and modifications thereof are apparent to and within the scope of those skilled in the art without departing from the scope of the appended claims.

What is claimed is:

1. An instrument for scattered light measurement as a function of time, angle and wavelength, the combination of:
   a radiation source;
   a monochromator for sorting radiation from said source;
   a sample cell;
   a radiation detector for providing an electrical output signal varying as a function of incident radiation;
   means defining a first radiation path from said monochromator to said sample cell;
   detector mounting means mounting said detector adjacent said cell and including reflective means defining a scattered light path from said cell to said detector, said detector mounting means being movable about said cell such that the scattered light may be measured over a wide angle with respect to the radiation beam path through said cell; said detector providing an electrical sample signal varying as a function of said scattered light;
   means defining a second radiation path from said monochromator to said detector, said means including radiation attenuating means, said detector providing an electrical reference signal varying as a function of the radiation from said monochromator;
   means for varying the intensity of the radiation from said monochromator;
   a beam switcher for directing radiation from said monochromator alternately along said first and second radiation paths;
   first circuit means connected to said radiation detector and operated in synchronism with said beam switcher for attenuating said reference signal and for passing said sample signal unattenuated;
   second circuit means connected to said first circuit means and to said means for varying the intensity of the radiation from said monochromator and having said reference signal as an input for maintaining the intensity of the radiation output of said monochromator substantially constant; and
   third circuit means connected to said first and second circuit means and having said reference and sample signals as input signals for providing an output signal that is the ratio of said input signals.

2. An instrument for scattered light measurement as a function of time, angle and wavelength, the combination of:
   a radiation source;
   a sample;
   a radiation detector for providing an electrical output signal varying as a function of the incident radiation;
   means defining a first radiation path from said source to said sample;
   detector mounting means mounting said detector adjacent said cell and including reflective means defining a scattered light path from said cell to said detector, said detector mounting means being movable about said cell such that the scattered light may be measured over a wide angle with respect to said first radiation path;
   means defining a second radiation path from said source to said detector, said means including radiation attenuating means;
   a beam switcher for directing radiation from said source alternately along said first and second radiation paths;
   said detector providing an electrical sample signal varying as a function of the incident radiation along said scattered light path and an electrical reference signal varying as a function of the radiation along said second radiation path; and
   circuit means connected to said radiation detector for providing an output signal that is the ratio of said sample signal to said reference signal; said circuit means including means for disconnecting said reference signal for providing an output signal that is proportional to said sample signal.

3. An instrument for scattered light measurement as a function of time, angle and wavelength, the combination of:
   a radiation source;
   a monochromator for sorting incident radiation from said source;
   a sample;
   a radiation detector for providing an electrical output signal varying as a function of the incident radiation;
   means defining a first radiation path from said monochromator to said sample;
   detector mounting means mounting said detector adjacent said cell and including reflective means defining a scattered light path from said cell to said detector, said detector mounting means being movable about said cell such that the scattered light may be measured over a wide angle with respect to said first radiation path;
   means defining a second radiation path from said monochromator to said detector, said means including radiation attenuating means;
   a beam splitter for directing radiation from said monochromator alternately along said first radiation path and said second radiation path;
   said detector providing an electrical sample signal varying as a function of the intensity of said scattered light and a reference signal varying as a function of the radiation intensity along said second radiation path;
   slit means for varying the intensity of the radiation from said monochromator;
   first circuit means connected to said radiation detector and to said slit means for varying said slit means in response to variations in said reference signal;
   second circuit means connected to said radiation detector and to said first circuit means for providing an output signal that is the ratio of said sample signal to said reference signal, said second circuit means including means for disconnecting said reference signal for providing an output signal that is proportional to said sample signal.

4. An instrument for scattered light measurement as a function of time, angle and wavelength, the combination of:
a radiation source;
a monochromator for sorting radiation from said source;
a sample;
a radiation detector for providing an electrical output signal varying as a function of the incident radiation;
means defining a first radiation path from said monochromator to said sample;
detector mounting means mounting said detector adjacent said sample and including reflective means defining a scattered light path from said sample to said detector, said detector mounting means being movable about said sample such that the scattered light may be measured over a wide angle with respect to said first radiation path, said detector providing an electrical sample signal varying as a function of said scattered light;
means defining a second radiation path from said monochromator to said detector, said means including radiation attenuating means, said detector providing an electrical reference signal varying as a function of the radiation from said monochromator;
a beam splitter for directing radiation from said monochromator alternately along said first radiation path and said second radiation path;
and means including attenuator means attenuating said reference signal and passing said sample signal unattenuated for providing an output signal that is a ratio of said sample signal to said reference signal, said means further including means for disconnecting said reference signal for providing an output signal that is proportional to said sample signal.

5. A scattered light measuring attachment for use with a double beam spectrophotometer having a cell compartment and first and second beams alternately passing through said cell compartment, said second beam being attenuated with respect to said first beam, said attachment comprising:
an enclosure having a projecting portion for insertion into said cell compartment;
a radiation detector and a sample cell mounting means monuted in said enclosure;
means including reflecting means mounted in said enclosure for directing said first beam along a first radiation path to a sample cell mounted in said sample cell mounting means;
detector mounting means mounting said detector adjacent said sample cell mounted in said sample cell mounting means and including reflective means defining a scattered light path from said sample cell to said detector, said detector mounting means being movable about said cell such that the scattered light may be measured over a wide angle with respect to the radiation beam path through said cell; and
means including reflective means mounted in said enclosure for directing said second beam along a second radiation path to said detector where said second radiation path is exclusive of said first radiation path.

6. A scattered light measuring attachment for use with a double beam spectrophotometer having a cell compartment and first and second beams alternately passing through said cell compartment, said second beam being attenuated with respect to said first beam, said attachment comprising:
an enclosure having a projecting portion for insertion into said cell compartment;
a rotatable disc mounted in said enclosure;
mounting means in said enclosure for mounting a sample cell coaxially with said disc;
detector means mounted on said disc;
first reflective means mounted on said disc and defining a scattered light path from a sample cell mounted in said mounting means to said detector whereby the scattered light from a sample in said cell may be measured over a wide angle as said disc is rotated;
means including reflecting means mounted in said enclosure for directing said first beam along a first radiation path to said sample cell mounted in said mounting means;
means including reflective means mounted in said enclosure for directing said second beam along a second radiation path to said detector where said second radiation path is exclusive of said first radiation path.

References Cited

UNITED STATES PATENTS 3,242,796   3/1966   Strickler _____ 88—14

OTHER REFERENCES

Jerrard: "A New Apparatus For Light Scattering Studies," Applied Optics, vol. 1, No. 3, May 1962, pp. 243–247.

Stamm: "Rayleigh's Ratio (Absolute Turbidity Levels) for Benzene, Carbon Tetrachloride, and Toulene," Jour. of Chem. Phys., vol. 21, No. 7, July 1953, p. 1304.

Guinand: "Sur l'Etude Experimentale, etc." J. chim. phys., vol. 51 (1954), pp. 276–280.

JEWELL H. PEDERSEN, *Primary Examiner.*

DAVID H. RUBIN, *Examiner.*

E. S. BAUER, *Assistant Examiner.*